No. 768,922. PATENTED AUG. 30, 1904.
A. H. WEAVER.
TWO WHEEL TONGUE SUPPORT.
APPLICATION FILED JULY 15, 1904.
NO MODEL.

Fig. 1.

Fig. 2.

Witnesses:

Inventor:
Adam H. Weaver.
By
Dan'l H. Herr.
Attorney.

No. 768,922. Patented August 30, 1904.

UNITED STATES PATENT OFFICE.

ADAM H. WEAVER, OF BLUEBALL, PENNSYLVANIA.

TWO-WHEEL TONGUE-SUPPORT.

SPECIFICATION forming part of Letters Patent No. 768,922, dated August 30, 1904.

Application filed July 15, 1904. Serial No. 216,666. (No model.)

*To all whom it may concern:*

Be it known that I, ADAM H. WEAVER, a citizen of the United States, residing at Blueball, in the county of Lancaster and State of Pennsylvania, have invented certain new and useful Improvements in Two-Wheel Tongue-Supports; and I do hereby declare the following to be a full, clear, and exact description of the invention, such as will enable others skilled in the art to which it appertains to make and use the same.

This invention relates to improvements in a tongue-support for holding in steady position the tongues or poles of different agricultural machines—such as grain-reapers, grass-mowers, land-rollers, and similar implements—and it is of that class of supports in which two colter-wheels are journaled onto the ends of a shaft passed axially through a prescribed hub centrally secured to the lower end of the prescribed arm depending from one end of a block swiveled to the under surface of a specially-constructed spring-bar upheld in operative position below the tongue it is designed to support, and the invention is held to be an improvement on the support patented to Michael M. Nolt and myself in No. 668,338, February 19, 1901, of which patent and invention I am now sole owner by virtue of two assignments, Nolt to Martin and Martin to Weaver, recorded in the United States Patent Office June 6, 1904, in Liber P 69, pages 359 and 360, respectively, of Transfers of Patents.

The chief object of the invention is when the support is used in heavy, damp, or mucky soil to prevent such soil, taken up by and wrapped around the colter-wheels, to fill or clog the space between the wheels and spring-bar, interfering with their free running.

The elements of the invention will severally and at large appear in the following description, and they will be separately or combinedly pointed out or set forth in the appended claims.

The purposes of the invention are attained by the mechanism, devices, and means illustrated in the accompanying drawings, similar reference characters designating like parts throughout the several views, in which—

Figure 1 is a side elevation of a tongue or pole horizontally placed with the elements embodying the invention in position thereon; but the near colter-wheel is removed, showing the journal-shaft, cotter-pin, and hub end with its supporting-arm; Fig. 2, an inverted plan of Fig. 1, showing the removed colter-wheel in restored position. Figs. 3 and 4 are right and left hand end elevations of Fig. 1 with both colter-wheels in place; Fig. 5, an enlarged transverse vertical section taken on broken line $x$ $x$ in Fig. 1 and viewed from the left, and Figs. 6, 7, 8, 9, and 10 are enlarged plans showing details of elements used in the construction.

In the drawings, A designates a portion of a tongue, as of a reaper or mower like that shown in said above-mentioned patent, with the horse-hitching double and swingle trees omitted. Against the opposite sides of the tongue A are arranged vertically-disposed hanger-bars B B, which have their lower ends connected by a headed bolt B', with a nut $b$ screwed home on its threaded end, said bolt serving to pivot or hinge between said lower ends a spring-bar yet to be described. The hanger-bars are securely clamped against the sides of the tongue by a clip C, composed of clip-bars $c$ $c$, a bolt C', with a nut $c'$ screwed home on its threaded end, uniting the upper ends of the clip-bars, and a bolt $C^2$, with a nut $c^2$ screwed home on its threaded end, uniting their lower ends, said bolt C' engaging on the top of the tongue and against the rear edges of the hanger-bars and said bolt $C^2$ passing underneath the tongue and engaging against the front edges of said bars, thereby supporting said clip-bars in downwardly and forwardly inclined positions diagonally across the outer surfaces of the hanger-bars and between the respective bolts C' $C^2$. In the invention as thus far hereinbefore described there is shown to be nothing new over and above what has been disclosed in the patent to Nolt and Weaver above mentioned, and the adjustment of the hanger-bars B of this invention is similar to that of the hanger-bars B mentioned in said patent; but the new elements in this invention will now be described.

Underneath the tongue is arranged a spring-bar D, composed of three blades $d$ $d'$ $d^2$ of the required dimensions, being shaped in side elevation as shown in Fig. 1 and of which the blades $d$ and $d^2$ are made from one continuous piece, the blade $d$ at the required point having its forward end firmly but removably secured to the under side of the tongue by a bolt $D'$ passed therethrough, with a nut $d^3$ screwed home thereagainst. From this point the blade extends downwardly and rearwardly, sloping the required distance where in its body is formed a slight downwardly-concaved curve $d^4$, and from thence it extends rearward in practically level lines parallel with the tongue to the hanger-bars B therebetween and above the hinge-bolt $B'$, about which bolt it is closely folded and forwardly extended the required distance to form the blade $d^2$, lying in close proximity to said blade $d$, but with a prescribed recess or space therebetween, in which recess is placed the blade $d'$, which latter blade by filling said space and abutting against said bolt completes the spring-bar and its hinge-joint at the lower ends of said hanger-bars.

Underneath the straight portion of the spring-bar D at a prescribed point rearward from the curve $d^4$ is arranged a swivel-joint E, supporting the two-wheel colter in operative position, and which joint is composed of the following instrumentalities: At this point the blades $d$ $d'$ $d^2$ are respectively provided with a tier or column of registering orifices $d^5$ $d^6$ $d^7$ for engagement of a securing-bolt yet to be described. On top of the blade $d$ is placed a washer $E'$, having a central orifice $e$ to overlie and register with said orifice $d^5$. Against the under side of the blade $d^2$ is placed a plate $E^2$, provided with side ribs $e'$ to engage against the edges of the said blade, holding the plate steady and preventing it from turning, and having at its center a downwardly-projecting tubular journal lug or stud $e^2$ of the required dimensions, and whose axial bore $e^3$, opening through the plate, making a continuous bolt passage-way therethrough and through the spring-blades and washer $E'$, underlies said orifice $d^7$ and registers therewith. Between two ring-washers $E^3$ $E^3$, with central apertures $e^4$ sleeved through said apertures on the stud, is a swivel-block $E^4$ with a central aperture $e^5$, and through said aperture is journaled thereon, with the lower end of the stud practically flush with or a trifle below the under surface of the lower washer $E^3$. A headed bolt $E^5$, passing through said passage-way, its head $e^6$ engaging on the washer $E'$ and its screw-threaded end below said washer $E^3$, with a nut $e^6$ firmly screwed home thereon, serves to securely hold the several parts together, completing the swivel-joint. Integral with the rearward end edge of said block $E^4$ is a downwardly and rearwardly sloping arm $E^7$, having at its lower end a prescribed hub $e^7$, carrying through the axial bore thereof a prescribed shaft $E^8$, on the spindle ends of which are journaled the hubs of the colter-wheels $E^9$ $E^9$, secured in place by cotter-pins $e^8$ passing through said spindle ends, thus completing the tongue-support of this invention.

The invention having thus been ascertained and described and the manner in which its functions are performed, fully shown, and set forth, what is considered new, and desired to be secured by Letters Patent, is—

1. The combination in a tongue-support, with the hanger-bars adjustably secured to the sides of the tongue and a hinge-bolt connecting the lower ends of said hanger-bars, of a three-bladed spring-bar downwardly and rearwardly sloping, with its forward end removably secured to the under side of the tongue and its rearward end hinged about said bolt, with swiveled means provided on the under side of said bar, said means having a downwardly and rearwardly sloping arm with a tubular hub secured to the lower end thereof, and a colter-wheel rotatably mounted against each end of said hub, substantially as described and for the purpose hereinbefore set forth.

2. The combination in a tongue-support, with a tongue and vertically-disposed hanger-bars in engagement with the opposite sides of the tongue, and a hinge-bolt connecting the lower ends of said hanger-bars, with clamping means provided to adjustably secure said bars in place, of a three-bladed spring-bar with a rear end horizontal portion and a forward end upwardly-sloping portion, with its forward upper end removably secured to the under side of the said tongue and the rear lower end thereof hinged onto said hinge-bolt, a block swiveled to the under side of said spring-bar, said block having at its rearward end a downwardly and rearwardly sloping arm, with the tubular hub integrally attached to the lower end thereof, a shaft journaled through the axial bore of said hub, and a colter-wheel revolubly mounted on each end of said shaft, substantially as described and for the purpose hereinbefore set forth.

In testimony whereof I affix my signature in presence of two witnesses.

ADAM H. WEAVER.

Witnesses:
HARVEY B. LUTZ,
DANL. H. HERR.